Patented Oct. 7, 1930

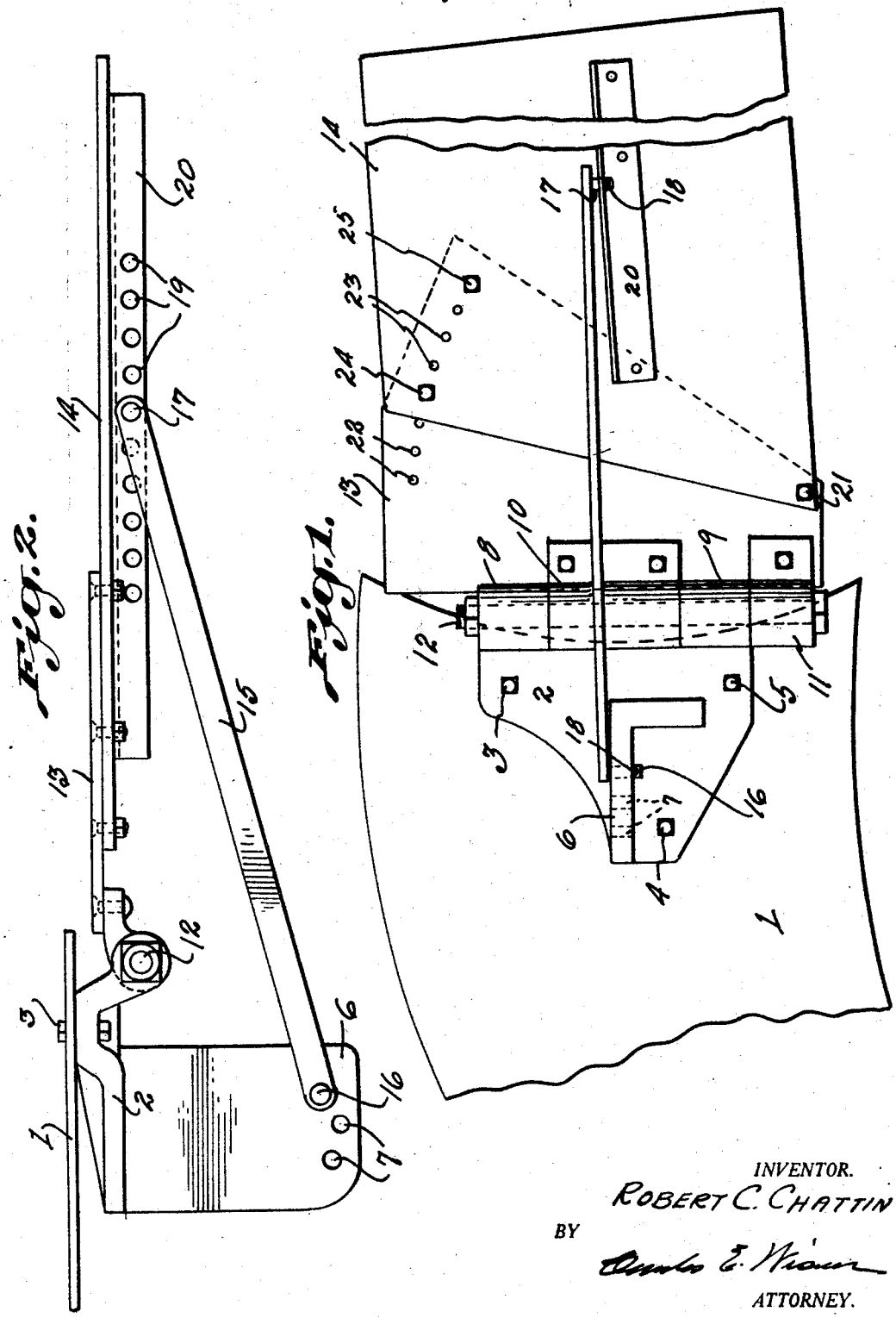

1,777,689

UNITED STATES PATENT OFFICE

ROBERT C. CHATTIN, OF MOUNTAIN HOME, IDAHO, ASSIGNOR, BY MESNE ASSIGNMENTS, TO BURNHAM MANUFACTURING COMPANY, OF BOISE, IDAHO, A CORPORATION OF UTAH

EXTENSION WING FOR IRRIGATION DITCHERS

Application filed May 22, 1929. Serial No. 365,102.

This invention relates to extension wings for irrigation ditchers, the object being to provide a quick detachable extension for the wing side of ditching machines of the type shown in my Patent No. 1,672,557 and adapted to be varied in position in either a horizontal or vertical plane.

The purpose of the invention is to provide a new and useful construction securing greater strength of parts in their adjustable relationship, to simplify the construction and is an improvement over the structure shown in my United States Patent No. 1,672,557 of June 5, 1928, particularly in the means employed for adjusting the extension in a horizontal plane relative to the ditcher wing to which the extension is attached.

The preferred embodiment of the invention is shown in the accompanying drawings in which—

Fig. 1 is an elevation showing the interior of the wing side of an irrigation ditcher.

Fig. 2 is a plan view thereof.

As in the former patent the extension is applied to the wing member of the ditcher here indicated by the numeral 1 and this wing member is similar in character to that used in the mold board of a plow and the extension is provided to carry the earth passing from the ditcher wing 1 outwardly to varying distances and heights from the point of delivery thereto by the wing member 1.

In this improved construction I provide a hinge member consisting of a plate 2 fixedly attached to the member 1 by bolts 3, 4, 5. This plate, which is positioned substantially in a vertical plane, or nearly so depending upon the shape of the wing member 1 is provided with an inwardly extending bracket 6, preferably L shaped in form to insure strength, and having a series of apertures at the inner end as indicated at 7, 7. This plate 2 terminates at its rear edge in a pair of apertured cylindrical hinge members 8 and 9 in spaced relation to receive therebetween the companion hinge parts 10 and 11 through which a removable bolt 12 is positioned providing the hinge pintle. These hinge parts 10 and 11 are bolted to a plate 13 which is therefore adapted to swing on a substantially vertical axis relative to the wing member 1. The extension wing 14 may be of any desired shape it being here shown as a plate of practically rectangular form and flat face but the shape of this member may be varied as may be desired to effectually carry the earth outwardly and away from the ditcher.

In structures of this class the front end of the ditcher, which includes the member 1, rides in the bottom of the ditch being formed and the wing member 1 tends to turn the earth over and away from the bottom of the ditch. As these ditches are of various depths it is necessary oftentimes to carry the earth upwardly to form a bank considerably higher than the bottom of the ditch and for this purpose the detachable extension wing is provided and is adapted to be adjusted about both a horizontal axis and the pintle 9 of the hinge member.

The adjustment about the hinge pintle is secured by means of an adjusting bar 15 which has pins 16 and 17 at opposite ends thereof preferably formed by forging the same thereon and each of these pins has an eye 18 at the lower end to receive a cotter pin to secure it in place. At the front end the pin 16 extends through one of the apertures 7 of the bracket 6 and at the rear end the pin 17 may be positioned in any one of the apertures 19 provided in the inwardly projecting flange of the angle iron member 20 bolted to the inside face of the extension 14. With this bar of fixed distance between the pins it will be readily observed that the wing member 14 and the plate 13 to which it was attached may be turned about the hinge pintle to extend outwardly at an angle to the outer face of the wing 1 of the ditcher or to extend in parallel relation therewith as indicated in Fig. 2.

To permit adjustment of the extension 14 about a horizontal axis in a vertical plane, the member 14 at its lower forward edge is pivotally supported to the member 13 by means of a bolt 21. The upper end of the member 13 is provided with a series of apertures 22 formed on an arc whose center is the bolt 21. The extension wing 14 has a similar series of holes 23 adapted to register with the holes 22 of the plate 13.

By raising or lowering the wing member 13 in a vertical plane and introduction of bolts 24 and 25 through registering apertures of the respective plates the position of the extension wing 14 in a vertical plane may be varied. It is to be noted that the apertures in the member 20 and plate 6 are of sufficient size to permit introduction of the pins 16 and 17 in the apertures of the respective plates in any of the possible adjusted positions of the member 14 in a vertical plane.

It is to be noted that the improvement herein described differs from that shown in my Patents No. 1,672,557 and No. 1,703,098 as the adjusting means for the extension wing are all carried by the wing side of the ditcher. In the previous constructions portions of the wing adjusting mechanism are carried by the land side and therefore limits the range of adjustment and is not adapted for quick attachment or detachment. In the present case, particularly by forming a plate such as the plate 6 to extend inwardly a distance from the inner face of the wing member, the bar 15 is always at an angle to properly take the pressure to which the extenson 14 may be subjected.

In the present construction also, by simply removing the bolt 9 and detaching the adjusting bar from the plate 6, the entire wing member may be detached and thus the ditcher may be used with or without the extension as may be necessary depending upon the character or form of the ditch to be made.

The invention therefore resides in the formation of the hinge member having the inwardly projecting portion such as the plate or bracket 6, the adjustment bar of fixed length cooperating therewith as described and all arranged for quick attachment or detachment of the extension wing relative to the wing member of the ditcher.

Having thus briefly described my invention, what I claim and desire to secure by Letters Patent of the United States is—

1. An adjustable extension wing for the wing side of irrigation ditchers comprising the combination with the said wing side, of a hinge member one part of which is secured to the rear edge of the ditcher wing and the other part of which is secured to the extension adapting the extension to be turned about the hinge axis, the hinge part attachable to the ditcher wing having a horizontally extending portion provided with a series of apertures adjacent its end, an adjusting bar having pin like portion at one end adapted to be inserted in any of the apertures of the said horizontal portion, and means on the extension wing for adjustably connecting the bar thereto to vary the position of the extension about the hinge axis.

2. An adjustable extension wing for the wing side of the irrigation ditchers comprising the combination with the said wing side, of a hinge member one part of which is secured to the rear edge and inner side of the ditcher wing and the other part of which is secured to the forward edge and inner side of the extension, said hinge having a removable pintle permitting ready attachment or detachment of the extension wing, a member extending inwardly of the inner face of the ditcher wing having an aperture, a flange like member extending inwardly of the inner face of the extension and having a series of apertures in spaced relation practically parallel with the plane of the extension wing, an adjusting bar having spaced end portions adapted respectively to engage the aperture of the first named member extending inwardly of the ditcher wing and in any of the apertures in the corresponding member connected with the extension wing whereby the wing may be held in its adjusted position about the hinge axis.

3. An adjustable extension wing for the wing side of irrigation ditchers and the like, comprising the combination with the said wing side, of a hinge member one portion of which is attached to the rear edge of the ditcher wing, the other of which is attached to the said extension, the first of said sides of the hinge members being provided with a part projecting inwardly of the inner face of the ditcher wing and having a series of apertures adjacent its end, the extension wing having an apertured flange extending inwardly of the inner face thereof, an adjusting bar having parts adjacent opposite ends adapted to engage the apertures of the respective apertured members, and means for varying the position of the extension in the vertical plane.

4. A quick detachable extension wing for the wing side of irrigation ditchers comprising the combination with the said wing side of the ditcher, of a hinge member one portion of which is attached on the inner face and at the rear edge of said ditcher wing, the other of which is attached at the forward edge and inner face of the extension, a removable pintle for the hinge, the said first portion of the hinge member having an inwardly projecting part and the inner side of the extension wing having a longitudinal flange, the said flange having a series of spaced apertures and the extension on the said hinge portion also having an aperture, a removable adjusting bar having parts for engaging the said apertures, said extension being formed of two parts, the rear portion of which is relatively adjustable in a vertical plane.

In testimony whereof I sign this specification.

ROBERT C. CHATTIN.